US012528292B2

(12) United States Patent
(10) Patent No.: US 12,528,292 B2
(45) Date of Patent: Jan. 20, 2026

Miwa et al.

(54) LIQUID DISCHARGE HEAD, LIQUID DISCHARGE HEAD UNIT, AND LIQUID DISCHARGE APPARATUS

(71) Applicants: Keishi Miwa, Kanagawa (JP); Takuma Hirabayashi, Tokyo (JP)

(72) Inventors: Keishi Miwa, Kanagawa (JP); Takuma Hirabayashi, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 193 days.

(21) Appl. No.: 18/368,035

(22) Filed: Sep. 14, 2023

(65) Prior Publication Data

US 2024/0092081 A1 Mar. 21, 2024

(30) Foreign Application Priority Data

Sep. 16, 2022 (JP) ................................ 2022-148254

(51) Int. Cl.
*B41J 2/14* (2006.01)
*B41J 2/175* (2006.01)

(52) U.S. Cl.
CPC ....... *B41J 2/14233* (2013.01); *B41J 2/14016* (2013.01); *B41J 2/14274* (2013.01); *B41J 2/14314* (2013.01); *B41J 2/175* (2013.01)

(58) Field of Classification Search
CPC ......................... B41J 2/14233; B41J 2/14016; B41J 2/14274; B41J 2/14314; B41J 2/175; B41J 2002/14362; B41J 2002/14241
See application file for complete search history.

(56) References Cited

U.S. PATENT DOCUMENTS

2013/0050354 A1 2/2013 Kato et al.
2019/0275796 A1 9/2019 Miwa
(Continued)

FOREIGN PATENT DOCUMENTS

CN 1911664 A 2/2007
CN 102218917 A 10/2011
(Continued)

OTHER PUBLICATIONS

Extended European Search Report issued Feb. 2, 2024 in European Patent Application No. 23194556.9, 7 pages.
(Continued)

*Primary Examiner* — Bradley W Thies
(74) *Attorney, Agent, or Firm* — XSENSUS LLP

(57) ABSTRACT

A liquid discharge head includes: a nozzle plate having multiple nozzles; a diaphragm facing an inner face of the nozzle plate; multiple individual chambers between the nozzle plate and the diaphragm, the multiple individual chambers respectively communicating with the multiple nozzles; multiple actuators on a first face of the diaphragm opposite to a second face of the diaphragm facing the multiple individual chambers, the multiple actuators to deform the diaphragm to discharges a liquid in the multiple individual chambers from the multiple nozzles, respectively; a holder facing the multiple actuators and the diaphragm and joined to a peripheral portion of the diaphragm; a first joint at a first position around a periphery of the holder and joining the diaphragm and the holder; and multiple second joints joining the diaphragm and the holder at multiple second positions inside the first position, respectively.

17 Claims, 15 Drawing Sheets

(56) References Cited

U.S. PATENT DOCUMENTS

| | | | |
|---|---|---|---|
| 2020/0031113 | A1 | 1/2020 | Kondo et al. |
| 2020/0298569 | A1 | 9/2020 | Miwa |
| 2020/0298570 | A1 | 9/2020 | Masuda et al. |
| 2021/0016568 | A1 | 1/2021 | Miwa |
| 2021/0036208 | A1 | 2/2021 | Shimofuku et al. |
| 2021/0162759 | A1 | 6/2021 | Miwa et al. |
| 2021/0370675 | A1 | 12/2021 | Yoshita et al. |
| 2022/0242123 | A1 | 8/2022 | Hirabayashi et al. |
| 2023/0049164 | A1 | 2/2023 | Toyota et al. |
| 2023/0106664 | A1 | 4/2023 | Miwa |
| 2023/0130058 | A1 | 4/2023 | Miwa |
| 2023/0135522 | A1 | 5/2023 | Watanabe et al. |
| 2023/0139963 | A1 | 5/2023 | Miwa |
| 2023/0157177 | A1 | 5/2023 | Hirabayashi et al. |
| 2023/0249461 | A1 | 8/2023 | Matsuda et al. |

FOREIGN PATENT DOCUMENTS

| | | | | |
|---|---|---|---|---|
| CN | 107405920 | A | | 11/2017 |
| CN | 107428166 | A | | 12/2017 |
| JP | 2007299987 | A | | 11/2007 |
| JP | 2013-049191 | A | | 3/2013 |
| JP | 2013230591 | A | * | 11/2013 |
| JP | 2014-172281 | A | | 9/2014 |
| JP | 2019-104179 | A | | 6/2019 |
| JP | 2021-126893 | A | | 9/2021 |

OTHER PUBLICATIONS

U.S. Appl. No. 18/103,497, filed Jan. 31, 2023.

U.S. Appl. No. 18/116,323, filed Mar. 2, 2023.

The First Office Action mailed Aug. 6, 2025, in Chinese Application No. 202311177508.4, 16 pages including English translation.

* cited by examiner

COMPARATIVE EXAPLE

LIQUID DISCHARGE HEAD, LIQUID DISCHARGE HEAD UNIT, AND LIQUID DISCHARGE APPARATUS

CROSS-REFERENCE TO RELATED APPLICATIONS

This patent application is based on and claims priority pursuant to 35 U.S.C. § 119(a) to Japanese Patent Application No. 2022-148254, filed on Sep. 16, 2022, in the Japan Patent Office, the entire disclosure of which is hereby incorporated by reference herein.

BACKGROUND

Technical Field

The present embodiment relates to a liquid discharge head, a liquid discharge head unit, and a liquid discharge apparatus.

Related Art

Regarding liquid discharge apparatuses, such as a liquid discharge apparatus of an inkjet type, an actuator (piezoelectric element) vibrates a diaphragm to generate pressure to an individual chamber and, thus, liquid droplets are discharged through a minute nozzle hole of a nozzle plate due to the pressure. Such liquid discharge apparatuses are used in various fields. Some liquid discharge apparatuses are used to draw a high-quality figure on the body of a motor vehicle. Some liquid discharge apparatuses are used to discharge a liquid resist or a deoxyribonucleic acid (DNA) sample in a liquid manner.

SUMMARY

A liquid discharge head includes: a nozzle plate having multiple nozzles; a diaphragm facing an inner face of the nozzle plate; multiple individual chambers between the nozzle plate and the diaphragm, the multiple individual chambers respectively communicating with the multiple nozzles; multiple actuators on a first face of the diaphragm opposite to a second face of the diaphragm facing the multiple individual chambers, the multiple actuators to deform the diaphragm to discharges a liquid in the multiple individual chambers from the multiple nozzles, respectively; a holder facing the multiple actuators and the diaphragm and joined to a peripheral portion of the diaphragm; a first joint at a first position around a periphery of the holder and joining the diaphragm and the holder; multiple second joints joining the diaphragm and the holder at multiple second positions inside the first position, respectively; multiple housing areas each disposed between two of the multiple second joints, the multiple housing areas respectively housing the multiple actuators; and a non-joint area in which the diaphragm and the holder are not joined in a region except the first joint, the multiple second joints, and the multiple housing areas in the first joint.

In another embodiment of the present disclosure, the liquid discharge head unit includes multiple liquid discharge heads including the liquid discharge head.

In still another embodiment of the present disclosure, a liquid discharge apparatus includes the liquid discharge head unit.

According to the present embodiment, a deterioration in field rate due to entry of foreign substances to the bond face of a holder can be prevented with prevention of crosstalk.

BRIEF DESCRIPTIONS OF THE DRAWINGS

A more complete appreciation of embodiments of the present disclosure and many of the attendant advantages and features thereof can be readily obtained and understood from the following detailed description with reference to the accompanying drawings, wherein.

Figure 1A:
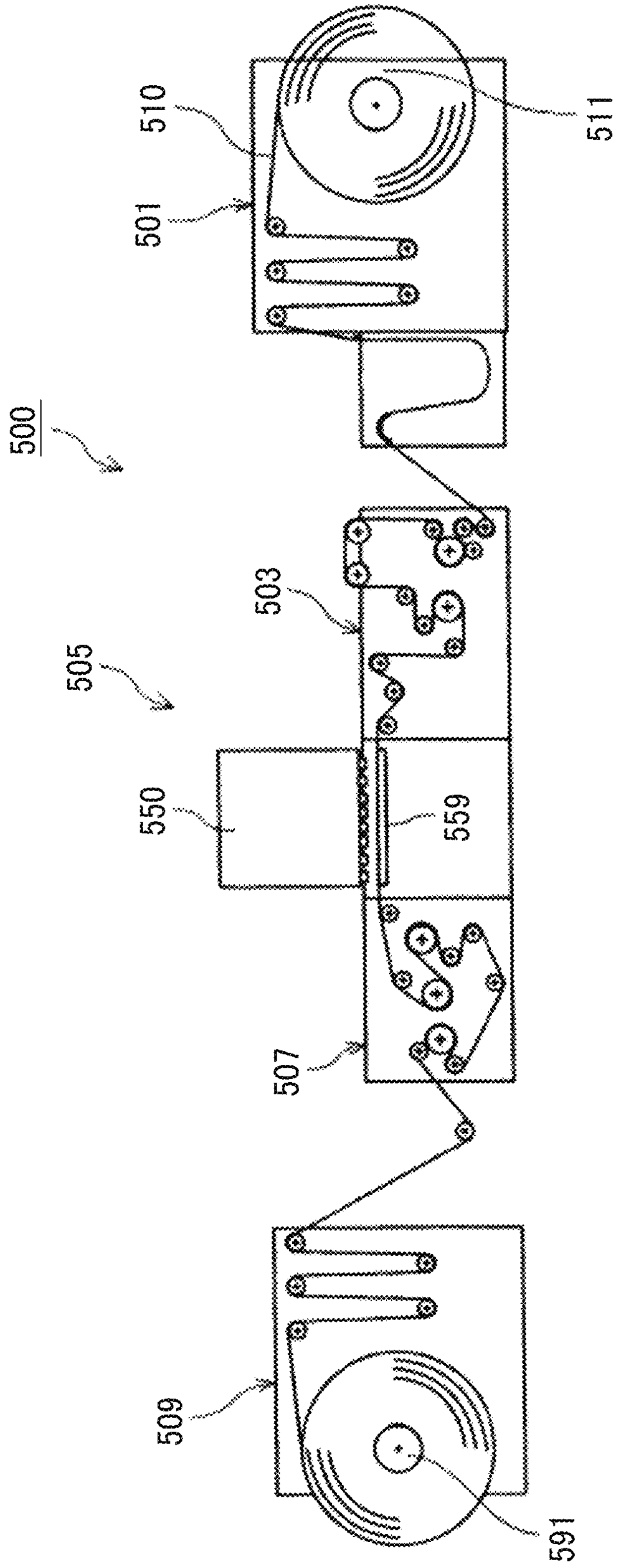
FIG. 1A is a schematic view of a liquid discharge apparatus according to an embodiment of the present embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments will be described below with reference to the drawings. For clarification of description, the following description and the drawings are appropriately omitted or simplified. Constituent elements and corresponding parts identical in configuration or function between each drawing are denoted with the same reference signs, and duplicate descriptions thereof will be omitted.

[Printer]

Figure 1B:
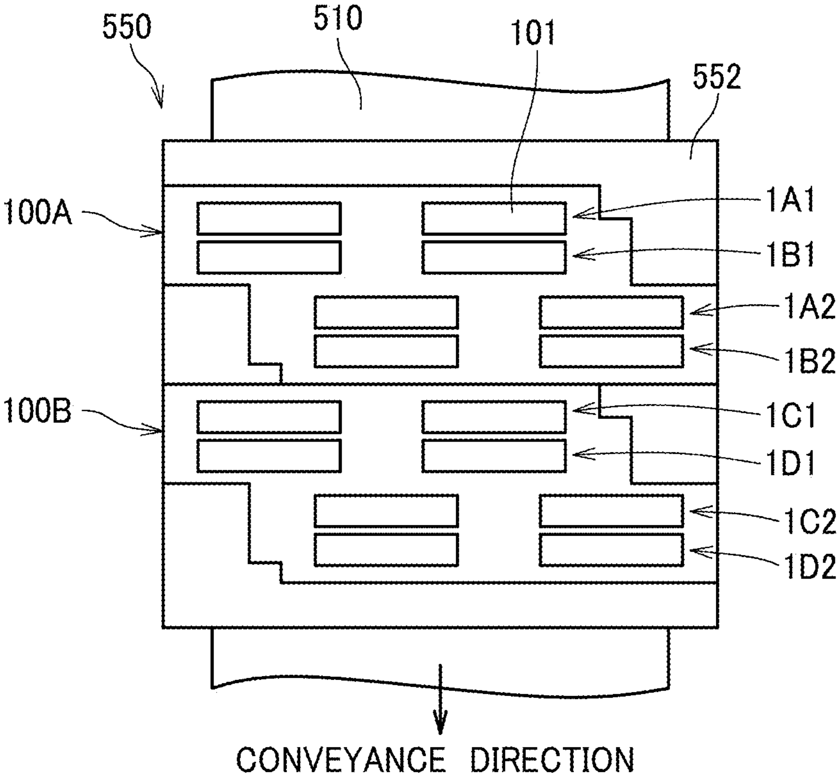
FIG. 1B is a plan view of a head unit in the liquid discharge apparatus.

Next, an exemplary liquid discharge apparatus according to the present embodiment will be described with reference to FIGS. 1A and 1B. FIG. 1A is a schematic view of a printer 50M including the liquid discharge apparatus. FIG. 1B is a plan view of a head unit 100 used in the printer 500.

The printer 500 includes a loader 501 that loads a continuous sheet 510, a guide conveyer 503 that guide-conveys the continuous sheet 510 loaded from the loader 501 to a printing unit 505, the printing unit 505 that performs printing such that an image is formed by discharge of liquid droplets to the continuous sheet 510, a dryer 507 that dries the continuous sheet 510, and an unloader 509 that unloads the continuous sheet 510.

The continuous sheet 510 fed from a sheet-wound roller 511 of the loader 501 is guide-conveyed by rollers in the loader 501, the guide conveyer 503, the dryer 507, and the unloader 509, and then is wound by a wind-up roller 591 of the unloader 509. In the printing unit 505, the continuous sheet 510 is conveyed on a conveyance guide 559 while facing a head unit 550, and an image is printed on the continuous sheet 510 with liquid discharged from the head unit 550.

As illustrated in FIG. 1B, the head unit 550 includes a common base 552 and two head units 100A and 100B according to the present embodiment on the common base 552. Then, the array direction of heads 101 orthogonal to the conveyance direction of the head unit 100 is defined as ahead array direction. Liquid droplets identical in color are discharged with the head arrays 1A1 and 1A2 of the head unit 100A. Similarly, the head arrays 1B1 and 1B2 of the head unit 100A are set in order to discharge liquid droplets in a desired color. The head arrays 1C1 and 1C2 of the head unit 100B are set in order to discharge liquid droplets in a desired color. The head arrays 1D1 and 1D2 of the head unit 100B are set in order to discharge liquid droplets in a desired color.

Note that a head unit according to the present embodiment can be integrated with a functional component or mechanism in order to serve as a liquid discharge unit. For example, a head unit and at least one of a head tank, a carriage, a supply mechanism, a maintenance mechanism, a main scanning movement mechanism, or a liquid circulator can be combined in configuration.

Examples of such integration include mutual fixation of a head unit and a functional component or mechanism by fastening, bonding, or engaging, and retention of a head unit and a functional component or mechanism, in which one is movable with respect to the other. A head unit and a functional component or mechanism may be mutually detachable.

The "liquid discharge apparatus" in the present embodiment is, for example, an apparatus that includes a head unit or liquid discharge unit and drives a liquid discharge head to discharge liquid droplets. Examples of the "liquid discharge apparatus" include an apparatus that discharges liquid droplets to a material to which liquid can adhere and an apparatus that discharges liquid to gas or liquid.

The "liquid discharge apparatus" can include a feeder, a conveyer, an ejector, a pre-treatment device, and a post-treatment device for a material to which liquid can adhere. Examples of the "liquid discharge apparatus" include an image forming apparatus that discharges ink to a sheet to form an image on the sheet and a three-dimensional fabrication apparatus that discharges fabrication liquid to a powder layer in which powder material is layered, in order to fabricate a three-dimensional fabrication object.

The "liquid discharge apparatus" is not limited to an apparatus that discharges liquid to visualize a meaningful image, such as a character or a figure. Examples of the "liquid discharge apparatus" include an apparatus that forms a meaningless pattern and an apparatus that fabricates a meaningless three-dimensional image.

The "material to which liquid can adhere" corresponds to a material to which liquid can adhere at least temporarily, such as a material to which liquid fastens after adhering to or a material into which liquid permeates after adhering to. Specific examples of the "material to which liquid can adhere" include recording media, such as a sheet, recording paper, a recording sheet, a film, and cloth, electronic components, such as an electronic substrate and a piezoelectric element, and media, such as a powder layer, an organ model, and a testing cell. Unless otherwise particularly limited, any materials to which liquid adheres are included.

The "material to which liquid can adhere" may be any material to which liquid can adhere even temporarily, such as paper, thread, fiber, fabric, leather, metal, plastic, glass, wood, or ceramic. The "liquid discharge apparatus" may be, but is not limited to, an apparatus that moves a liquid discharge head and a material to which liquid can adhere, relatively. Specific examples of the "liquid discharge apparatus" include a serial head apparatus that moves a liquid discharge head and a line head apparatus that does not move a liquid discharge head.

Examples of the "liquid discharge apparatus" include a treatment-liquid coating apparatus that discharges, for the purpose of reforming the surface of a sheet, treatment liquid to a sheet to coat the treatment liquid on the surface of the sheet, and a jet granulation apparatus that jets a composition liquid including row material dispersed in a solution, through a nozzle to granulate fine particles of the row material. Liquid to be discharged may have any viscosity or surface tension, provided that the liquid can be discharged from a head. Such liquid to be discharged is preferably, but is not particularly limited to, not more than 30 mPa·s in viscosity at normal temperature and normal pressure or due to heating or cooling.

More specific examples of liquid to be discharged include a solution, a suspension, and an emulsion that contain a solvent, such as water or an organic solvent, a colorant, such as dye or pigment, a functional material, such as a polymerizable compound, resin, or a surfactant, a biocompatible material, such as deoxyribonucleic acid (DNA), an amino acid, protein, or calcium, or an edible material, such as a natural pigment. Such a solution, a suspension, and an emulsion can be used, for example, for inkjet inks, surface treatment liquids, liquids for formation of constituent elements in an electronic element or light-emitting element or for formation of a resist pattern for an electronic circuit, or material liquids for three-dimensional fabrication.

Examples of a source that generates energy to discharge liquid droplets include a piezoelectric actuator (laminated piezoelectric element or thin-film piezoelectric element), a thermal actuator including an electrothermal conversion element, such as a heating resistive element, and an electrostatic actuator including a diaphragm and opposed electrodes. Note that the terms “image forming”, “recording”, “printing”, “image printing”, “print”, and “fabricating” used herein are synonymous with each other.

[Head Unit]

Figure 2A:
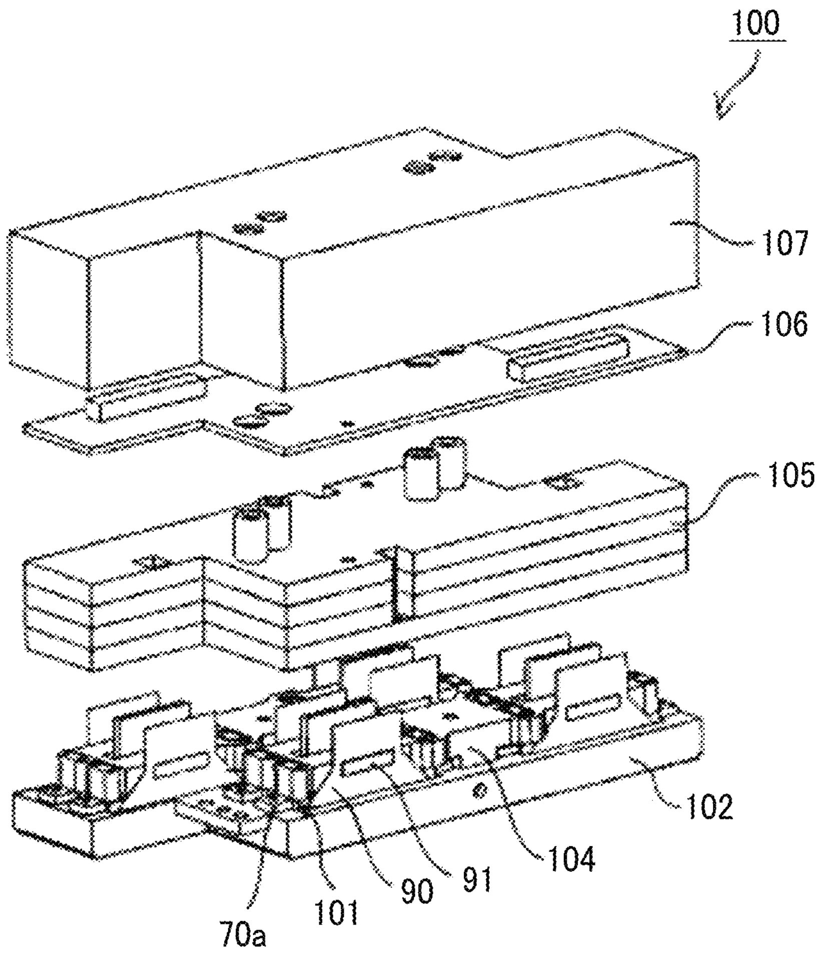
FIG. 2A is an exploded perspective view of the head unit according to the embodiment of the present embodiment.
Figure 2B:
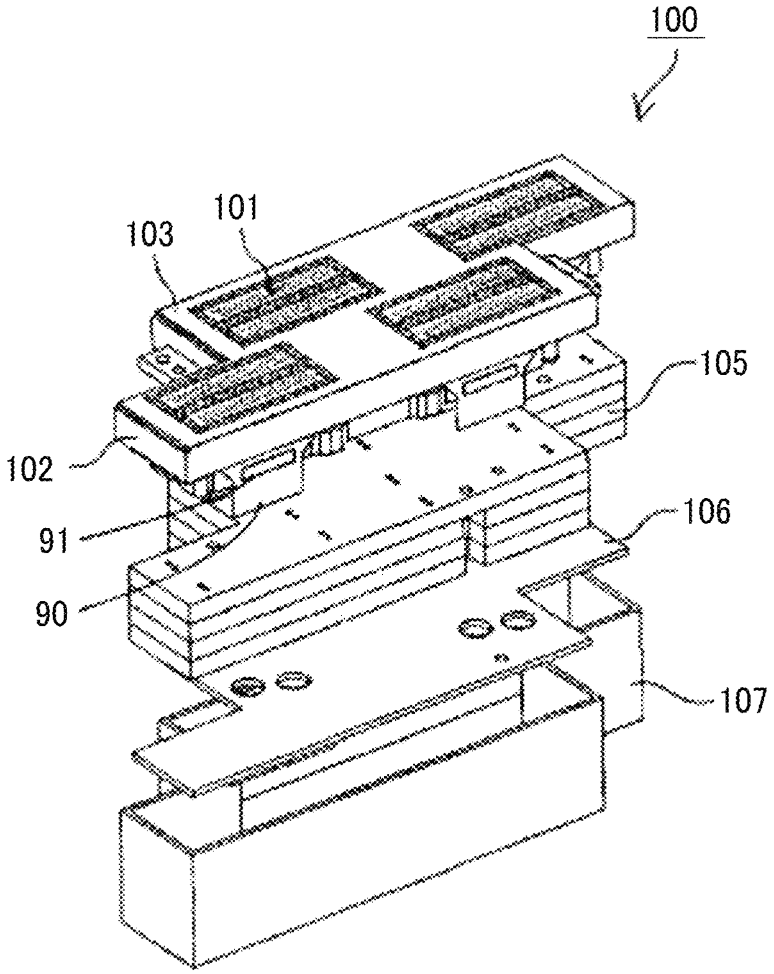
FIG. 2B is an exploded perspective view of the head unit from the side of location of a nozzle face.
Figure 3:
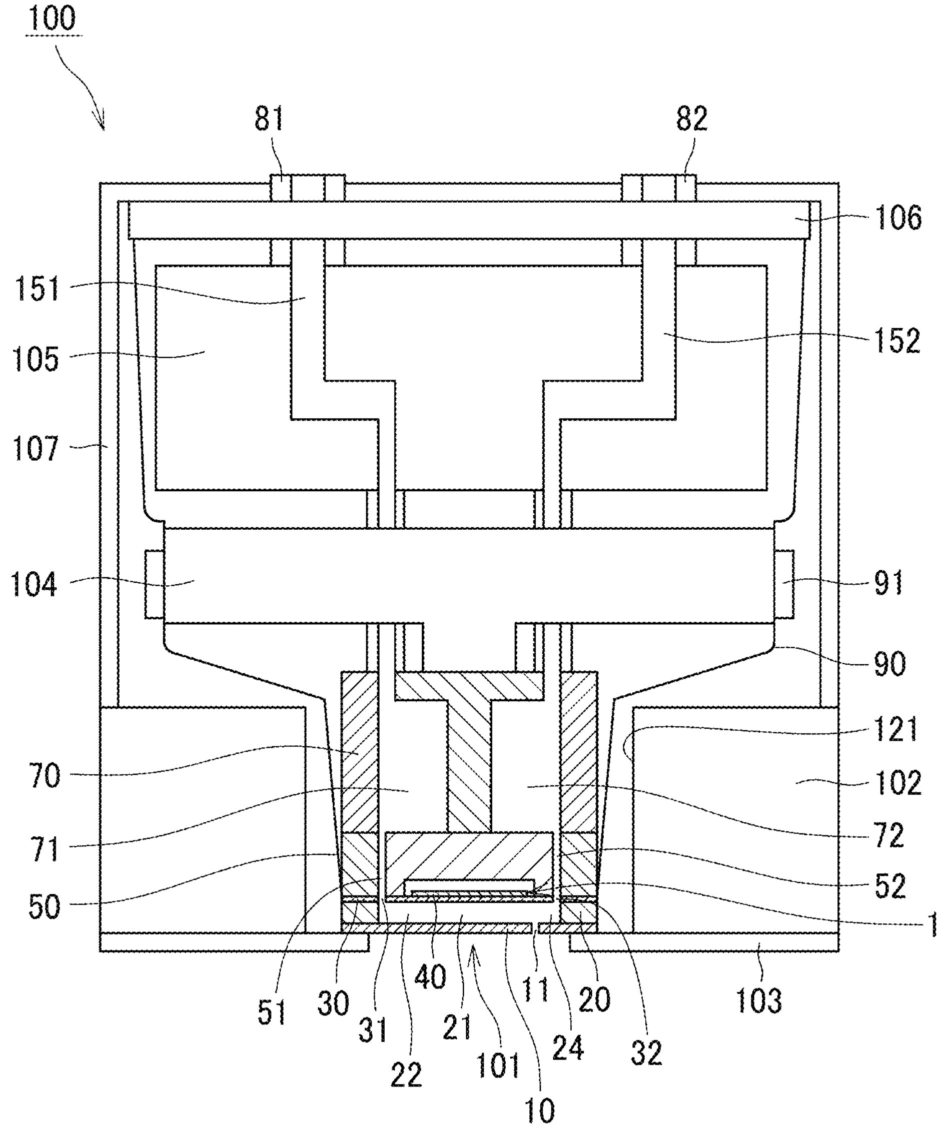
FIG. 3 is a cross-sectional view of the head unit along the lateral direction of the head unit.

Next, a head unit according to an embodiment of the present embodiment will be described with reference to FIGS. 2A to 3. FIG. 2A is an exploded perspective view of the head unit from the side of location of a holder. FIG. 2B is an exploded perspective view of the head unit from the side of location of a nozzle plate. FIG. 3 is a cross-sectional view of the head unit along the lateral direction of the head unit.

A head unit 100 includes a plurality of heads 101 each serving as a liquid discharge head that discharges liquid droplets, a base 102, a cover 103, a heat dissipater 104, a manifold 105, a printed circuit board (PCB) 106, and a module case 107.

The plurality of heads 101 each includes a nozzle plate 10 having a nozzle hole 11, an individual channel plate 20 forming an individual chamber 21 in communication with the nozzle hole 11, a diaphragm 30 including a piezoelectric element 40, an intermediate channel plate 50 as a holder for the diaphragm 30 disposed on the diaphragm 30, and a common channel member 70 disposed on the intermediate channel plate 50.

The individual channel plate 20 forms, in addition to the individual chamber 21, a supply-side individual channel 22 in communication with the individual chamber 21 and a collection-side individual channel 24 in communication with the individual chamber 21. The intermediate channel plate 50 forms a supply-side intermediate individual channel 51 in communication with the supply-side individual channel 22 through an opening 31 of the diaphragm 30 and a collection-side intermediate individual channel 52 in communication with the collection-side individual channel 24 through an opening 32 of the diaphragm 30.

The common channel member 70 forms a supply-side common channel 71 in communication with the supply-side intermediate individual channel 51 and a collection-side common channel 72 in communication with the collection-side intermediate individual channel 52. The supply-side common channel 71 is in communication with a supply port 81 through a channel 151 of the manifold 105. The collection-side common channel 72 is in communication with a collection port 82 through a channel 152 of the manifold 105.

The printed circuit board 106 and the piezoelectric element 40 of each head 101 are connected with a flexible wiring member 90 disposed between the printed circuit board 106 and the piezoelectric element 40. The flexible wiring member 90 has a driver integrated circuit (driver IC) 91 implemented.

In the present embodiment, the plurality of heads 101 spaced apart is attached to the base 102. For attachment of a head 101 to the base 102, the head 101 is inserted into an opening 121 with which the base 102 is provided, and the peripheral portion of the nozzle plate 10 of the head 101 is joined and secured to the cover 103 joined and secured to the base 102.

A flange 70*a* provided outside the common channel member 70 of the head 101 is joined and secured to the base 102. Note that securing a head 101 to the base 102 is not limited in structure, and thus a head 101 can be secured to the base 102 by bonding, caulking, or screwing.

Preferably, the base 102 is made of a material low in the coefficient of linear expansion. Examples of the material include 42 alloy of iron to which nickel is added and invar material.

In the present embodiment, invar material is used. Thus, even when a rise is made in the temperature of the base 102 due to heat generation of each head 101, since the base 102 is small in the amount of expansion, nozzle deviation from a predetermined nozzle position hardly occurs, resulting in reduction of deviation from a landing position.

The nozzle plate 10, the individual channel plate 20, and the diaphragm 30 are each made of a silicon single crystal substrate substantially identical in the coefficient of linear expansion to the base 102. Thus, deviation in nozzle position due to thermal expansion can be reduced.

First Embodiment

Next, a structure of joining between the diaphragm 30 and the intermediate channel plate 50 described above will be described. In the following description and the reference drawings, the intermediate channel plate 50 described above is given as a holder 12 for the diaphragm 30.

Figure 4A:
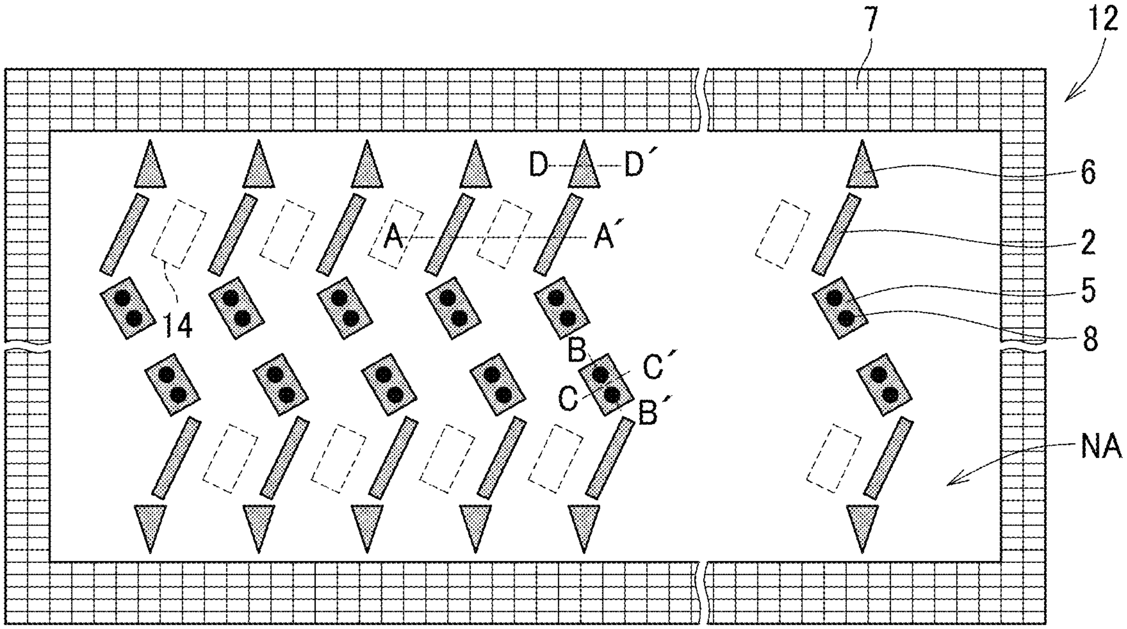
FIG. 4A illustrates the joint face that a holder has on the side of location of an actuator substrate in a liquid discharge head in a first embodiment.
Figure 4B:
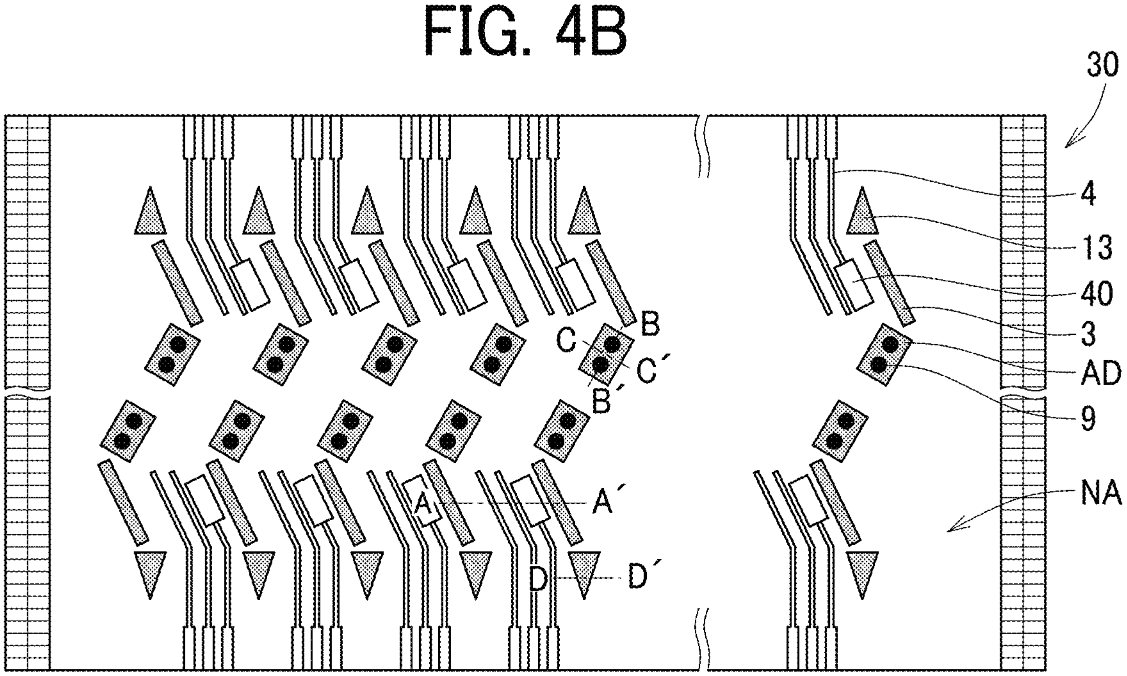
FIG. 4B illustrates the joint face that the actuator substrate has on the side of location of the holder in the liquid discharge head in the first embodiment.

FIG. 4A is a plan view of the holder 12 from the side of location of the diaphragm 30. FIG. 4B is a plan view of the diaphragm 30 from the side of location of the holder 12.

Such piezoelectric elements 40 as described above are disposed on the diaphragm 30. The piezoelectric elements 40 are each connected outward through a functional wiring member 4. The diaphragm 30 on which the piezoelectric elements 40 are disposed is also called an actuator substrate. As illustrated in FIG. 4D, a plurality of individual chambers 21 on the lower side of the diaphragm 30 is mutually independently partitioned by partition walls 26.

[First Joint and Second Joint]

The holder 12 is oblong and rectangular in shape and is provided with a first joint 7 having a predetermined width along the four sides of the holder 12. The first joint 7 shaped like a rectangular frame is joined to the four sides of the diaphragm 30 with adhesive.

As the adhesive, for example, resin material can be used. Particularly, for example, an epoxy heat-curable adhesive can be used. The Yong's modulus of the adhesive is preferably equal to or more than 2 GPa. The thickness of coating of the adhesive is, for example 1.0 to 3.0 μm.

A plurality of second joints 2 is formed in two lines in the longitudinal direction of the holder 12. Each second joint 2 is a single linear joint. Each second joint 2 is oblique at a predetermined angle with respect to the lateral direction of the holder 12. Thus, narrowing in pitch can be carried out due to effective use of the space on the diaphragm 30.

Between each second joint 2, formed is a housing area 14 that houses a piezoelectric element 40 on the diaphragm 30. Each second joint 2 has a length such that the housing area 14 is located between two parallel lines of which one line connects one end of one of adjacent second joints 2 and one end of the other and the other line connects the other end of the one and the other end of the other.

Such a housing area 14 herein does not necessarily need any member that demarcates the periphery of the housing area 14. Each housing area 14 houses at least a piezoelectric element 40.

Preferably, each second joint 2 has a width of 20 to 50 μm and a height of 15 to 50 μm. Preferably, the holder 12 has a thickness of 300 to 500 μm.

Figure 4C:
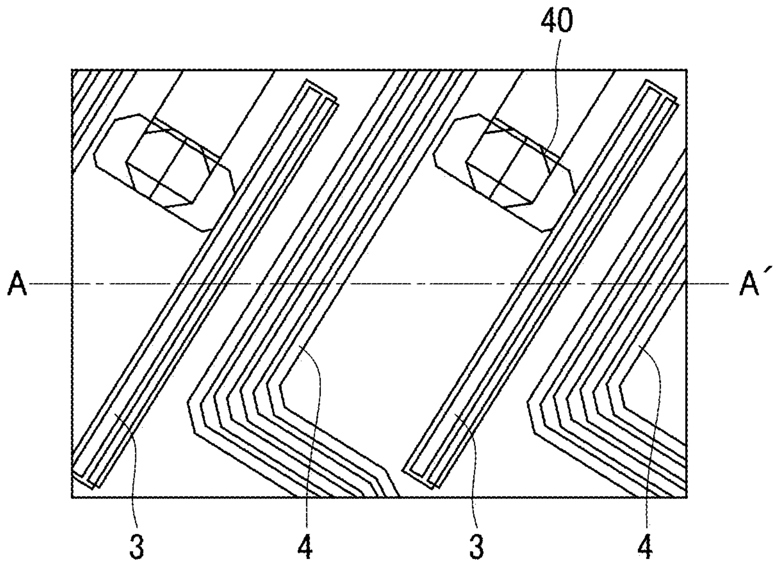
FIG. 4C is a plan view of the actuator substrate.
Figure 4D:
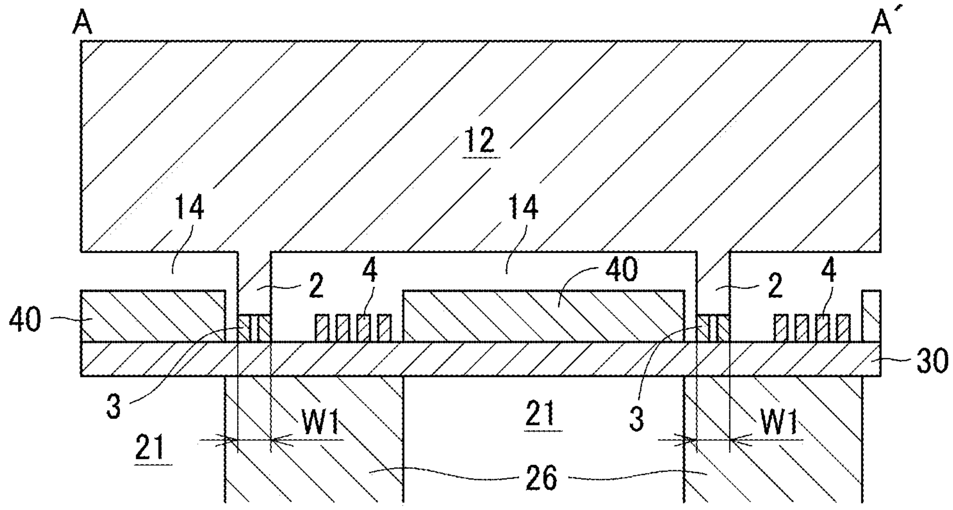
FIG. 4D is a cross-sectional view of the actuator substrate taken along line A-A'.
Figure 4E:
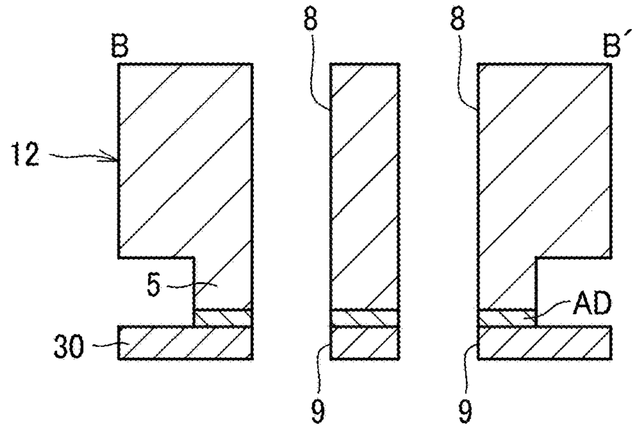
FIG. 4E is a cross-sectional view of the actuator substrate taken along line B-B'.
Figure 4F:
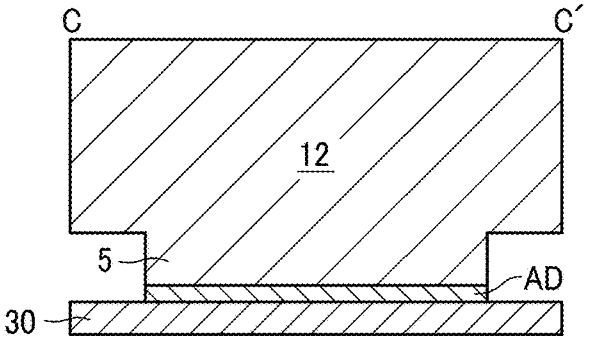
FIG. 4F is a cross-sectional view of the actuator substrate taken along line C-C'.
Figure 4G:
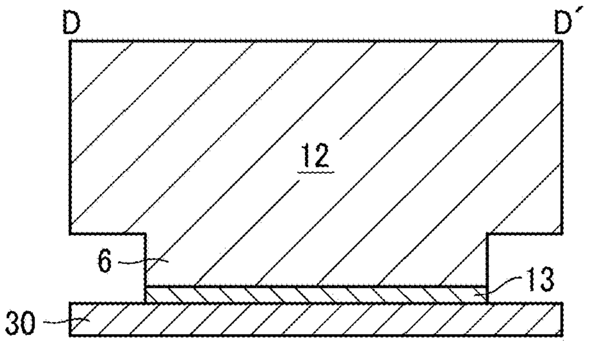
FIG. 4G is a cross-sectional view of the actuator substrate taken along line D-D'.
Figure 12:
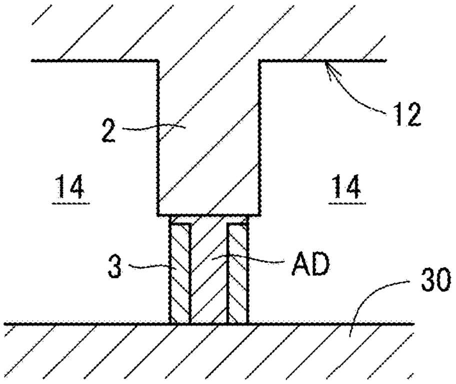
FIG. 12 is a cross-sectional view of a joint between a holder and an actuator substrate according to Modification 6.

As illustrated in FIGS. 4C, 4D, and 12, each second joint 2 is joined to the diaphragm 30 with a non-functional wiring member 3 and adhesive AD interposed between second joint 2 and the diaphragm 30. Each second joint 2 reduces crosstalk between piezoelectric elements 40.

Each non-functional wiring member 3 includes a pair of non-functional wiring members. The pair of non-functional wiring members of each non-functional wiring member 3 is disposed at a width W1 substantially identical to the width of the corresponding second joint 2 such that a gap is present between the pair of non-functional wiring members. The function of the gap will be described later with FIG. 12.

As the adhesive AD, for example, an epoxy heat-curable adhesive can be used. The Yong's modulus of the adhesive AD is preferably equal to or more than 2 GPa. The thickness of coating of the adhesive AD is, for example, 1.0 to 3.0 μm.

Sets of two supply channels 8 respectively corresponding to the housing areas 14 are formed between the two lines of the second joints 2. The sets of two supply channels 8 are each connected to a set of two supply channels 9 in the diaphragm 30 as in FIG. 4B. Then, the sets of two supply channels 9 of the diaphragm 30 are each connected to the corresponding individual chamber 21. Meanwhile, the upstream side of the sets of two supply channels 8 is connected to a main channel (common channel) leading to a plurality of supply channels respectively connected to a plurality of pressure chambers.

[Third Joint]

As in FIG. 4B, a third joint 5 integrated with the holder 12 is formed around each set of two supply channels 8 of the holder 12. Preferably, the third joint 5 has a height of 15 to 50 μm.

The third joint 5 is rectangular in shape and envelops the two supply channels 8. The third joint 5 is joined around the corresponding two supply channels 9 of the diaphragm 30 with adhesive AD. As the adhesive AD, for example, an epoxy heat-curable adhesive can be used. The Yong's modulus of the adhesive AD is preferably equal to or more than 2 GPa. The thickness of coating of the adhesive AD is, for example 1.0 to 3.0 μm.

As in FIG. 5A to be described later, the region including the periphery of each supply channel 8 inside the first joint 7 and the diaphragm 30 are joined wholly with a solid film 12*a*. In the present embodiment, restrictive formation of second joints 2, third joints 5, and fourth joints 6 enables an improvement in the yield rate of a liquid discharge head with a large reduction in the amount of a solid film.

[Fourth Joint]

A fourth joint 6 is formed between the first joint 7 shaped like a rectangular frame and each second joint 2 linear in shape inside the first joint 7. Preferably, each fourth joint 6 has a height of 15 to 50 μm.

Each fourth joint 6 is shaped like a triangular island and is joined, with adhesive, to an island-shaped joint pattern 13 on the side of location of the diaphragm 30 as in FIG. 4D. As the adhesive, for example, an epoxy heat-curable adhesive can be used. The Yong's modulus of the adhesive is preferably equal to or more than 2 GPa. The thickness of coating of the adhesive is, for example 1.0 to 3.0 μm.

The fourth joints 6 enable an enhancement in joining force at the peripheral portion between the holder 12 and the diaphragm 30. In addition, the fourth joints 6 enable reduction of crosstalk propagation that detours outward around the first joint 7. Locally inward protrusions of the first joint 7 enable omission of the fourth joints 6.

Comparison with Comparative Example

In the present embodiment, as described above, the region inside the first joint 7 shaped like a frame of the holder 12, except at least the second joints 2, the third joints 5, and the fourth joints 6, corresponds to a non-contact area (NA) in which the whole area and the diaphragm 30 are not joined together. The housing areas 14 each for a piezoelectric element 40 are included in the non-contact area NA.

Figure 5A:
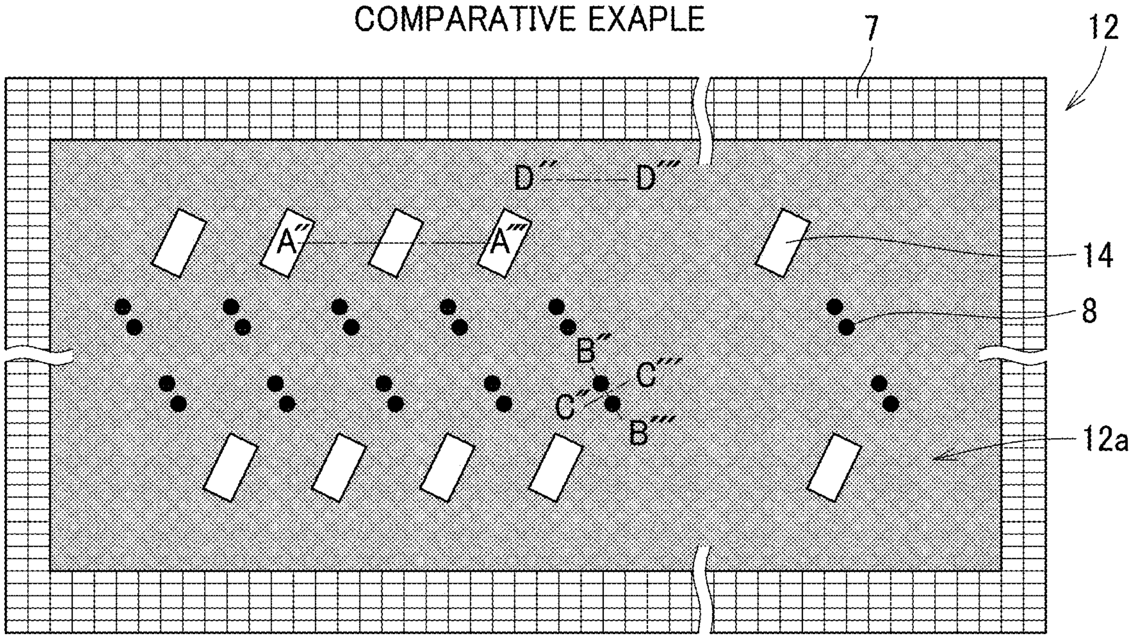
FIG. 5A illustrates the joint face that a holder has on the side of location of an actuator substrate in a comparative example.
Figure 5B:
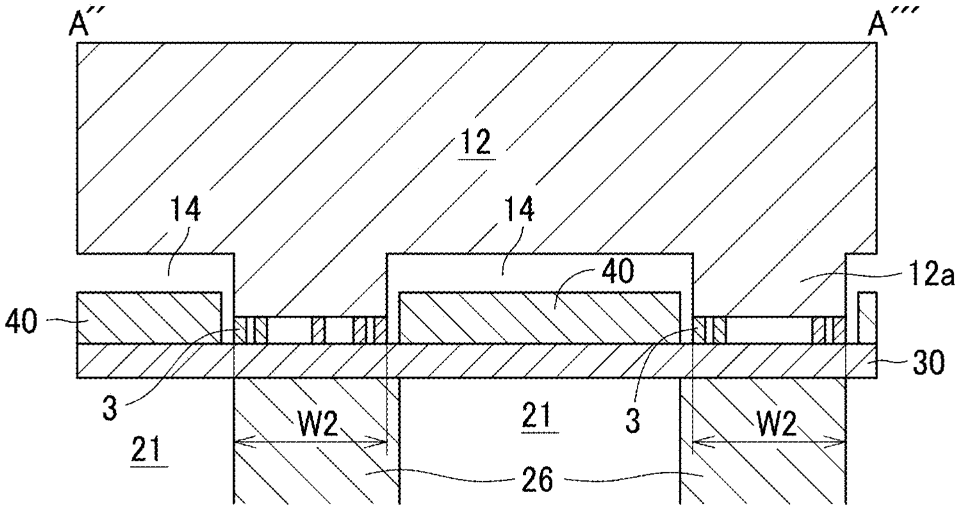
FIG. 5B is a cross-sectional view of the actuator substrate and the holder taken along line A"-A'"
Figure 5C:
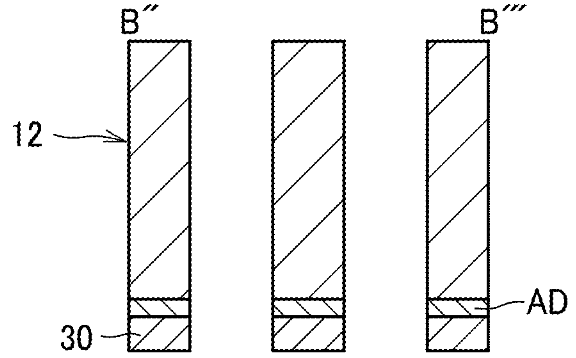
FIG. 5C is a cross-sectional view of the actuator substrate and the holder taken along line B"-B'"
Figure 5D:
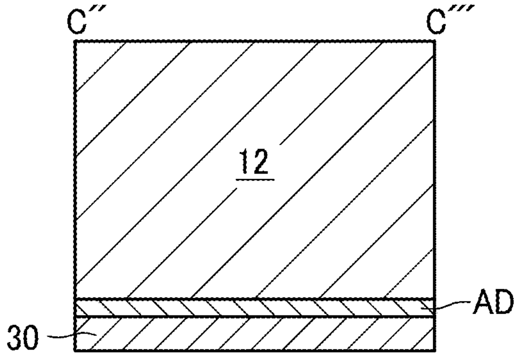
FIG. 5D is a cross-sectional view of the actuator substrate and the holder taken along line C"-C'"
Figure 5E:
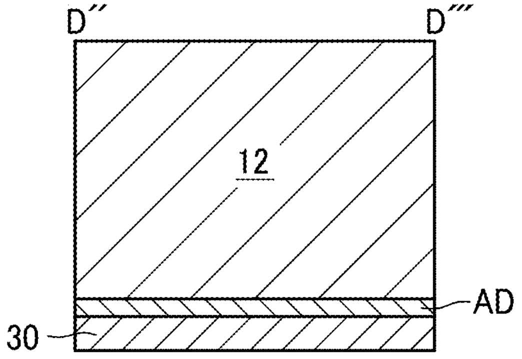
FIG. 5E is a cross-sectional view of the actuator substrate and the holder taken along line D"-D'"

In a comparative example, as illustrated in FIG. 5A, the region inside the first joint 7 shaped like a frame, except the housing areas 14 each for a piezoelectric element 40, is entirely joined to the diaphragm 30 with the solid film 12*a* of adhesive AD interposed between the region inside the first joint 7 and the diaphragm 30, as in FIGS. 5B to 5E. Between each piezoelectric element 40 (W1 in FIG. 4D<W2), the solid film 12*a* having a width W2 is joined to the diaphragm 30 with a non-functional wiring member 3 interposed between the solid film 12*a* and the diaphragm 30. Thus, as described above, foreign substances are likely to enter the solid film 12*a*, leading to a deterioration in the field rate of the liquid discharge head as a disadvantage.

In contrast to this, in the present embodiment, basically, the region inside the first joint 7 shaped like a frame, except the second joints 2 for reducing crosstalk between each piezoelectric element 40, corresponds to the non-contact area (NA) in which the holder 12 and the diaphragm 30 are not joined together. Thus, the bond face of the adhesive AD is considerably smaller than ever before, leading to considerably reducing a deterioration in the field rate of the liquid discharge head due to entry of foreign substances to the bond face.

Second Embodiment

Figure 6A:
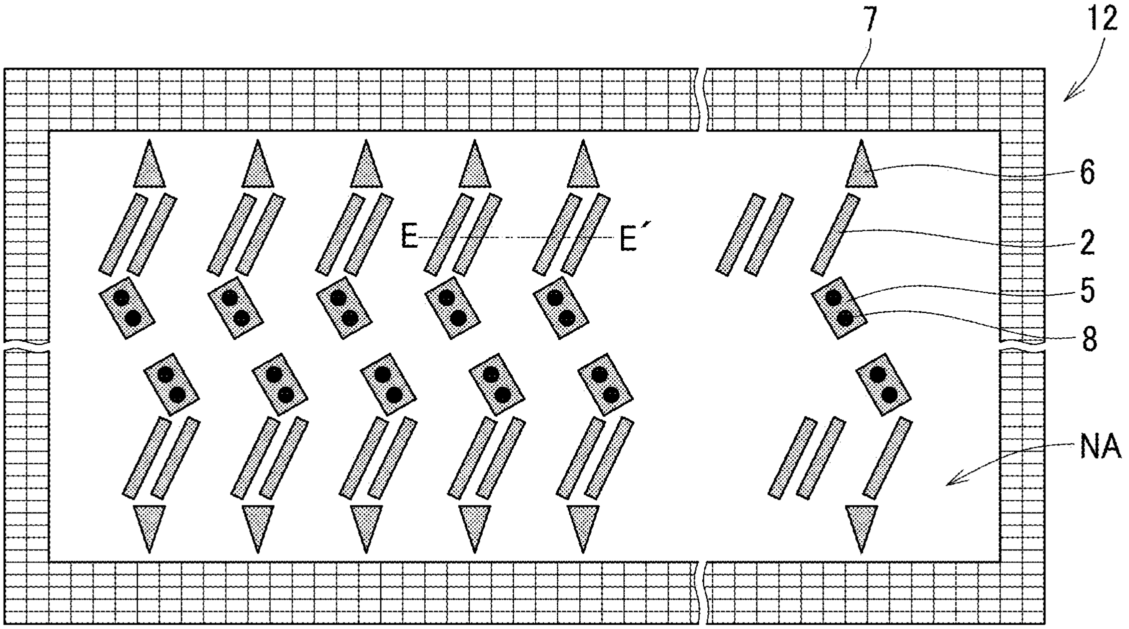
FIG. 6A illustrates the joint face that a holder has on the side of location of an actuator substrate in a liquid discharge head in a second embodiment of the present embodiment.
Figure 6B:
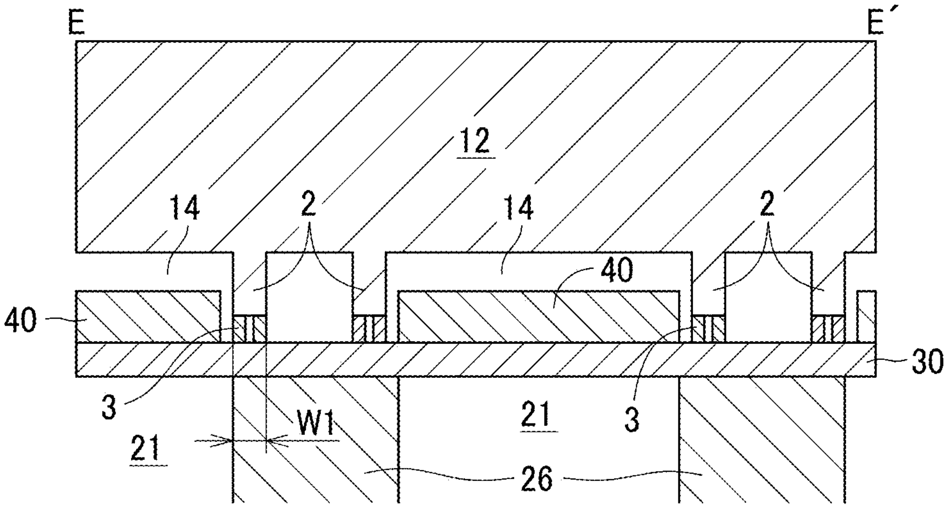
FIG. 6B is a cross-sectional view taken along line E-E'.

FIGS. 6A and 6B illustrate a second embodiment of the present embodiment. In the second embodiment, each second joint 2 includes two parallel linear joints. Although each second joint 2 is slightly larger in bond area than each second joint 2 in the first embodiment, the two parallel linear joints of each second joint 2 can be disposed between each piezoelectric element 40, leading to an enhancement in the effect of reducing crosstalk between each piezoelectric element 40.

Third Embodiment

Figure 7A:
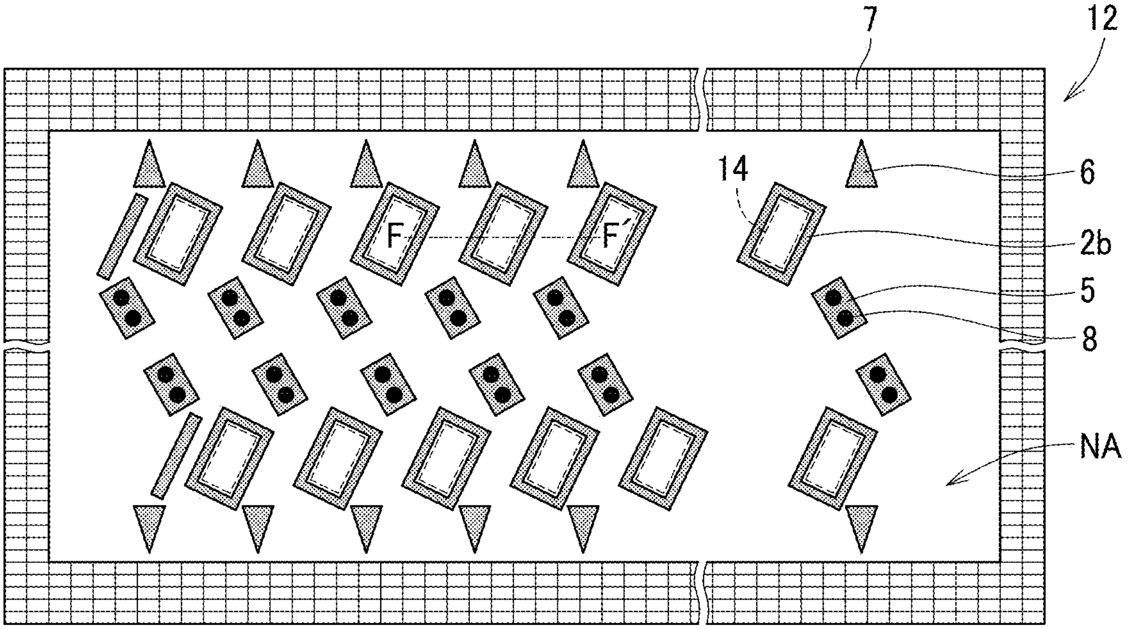
FIG. 7A illustrates the joint face that a holder has on the side of location of an actuator substrate in a liquid discharge head in a third embodiment of the present embodiment.
Figure 7B:
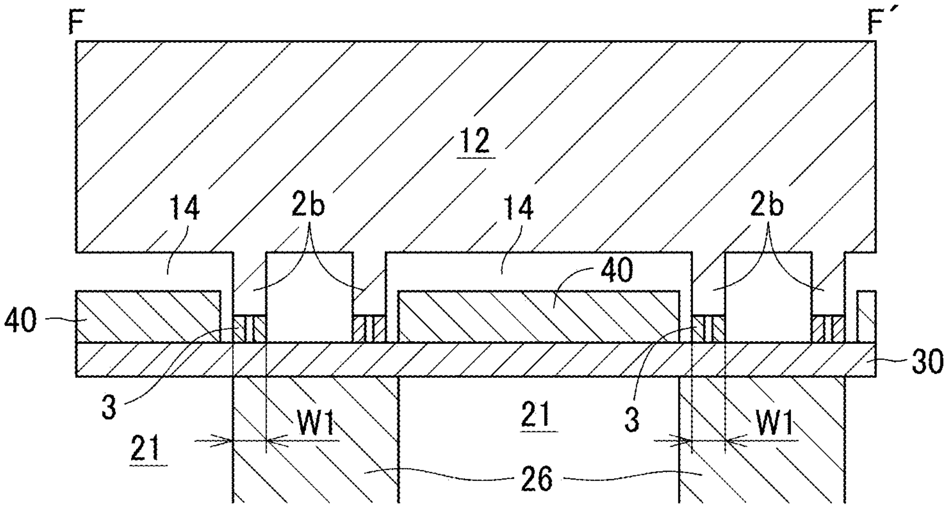
FIG. 7B is a cross-sectional view taken along line F-F'.

FIGS. 7A and 7B illustrate a third embodiment of the present embodiment. In the third embodiment, each second joint 2*b* is a surrounding joint. That is, each second joint 2*b* is shaped like a rectangular frame such that the second joint 2*b* envelops a housing area 14 for a piezoelectric element 40.

As above, the housing areas 14 for respective piezoelectric elements 40 are surrounded by the second joints 2*b* each shaped like a rectangular frame. Thus, it is possible to enhance the effect of reducing crosstalk between each piezoelectric element 40 although each second joint 2*b* is slightly larger in bond area than each second joint 2 in the first embodiment.

Fourth Embodiment

FIGS. 8A to 8D illustrate a modification of the island-shaped joint pattern 13 described above with FIG. 4D. As described above, joining of each fourth joint 6 and the corresponding island-shaped joint pattern 13 enables an enhancement in joining force at the peripheral portion between the holder 12 and the diaphragm 30. However, foreign substances are likely to enter the solid film of any island-shaped joint pattern 13.

Figure 8A:
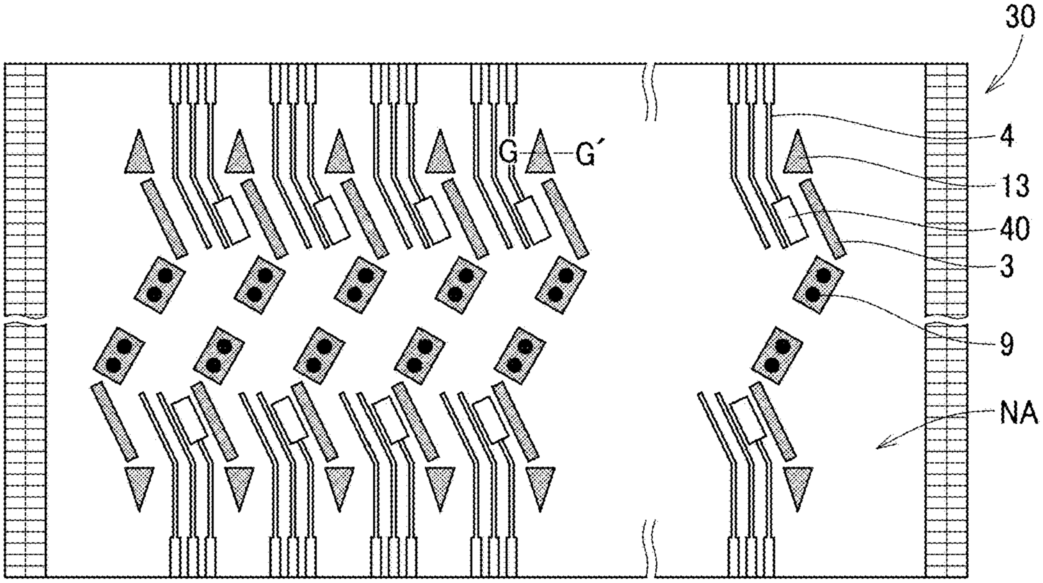
FIG. 8A is a plan view of the joint face that an actuator substrate has on the side of location of a holder in a fourth embodiment of the present embodiment.
Figure 8B:
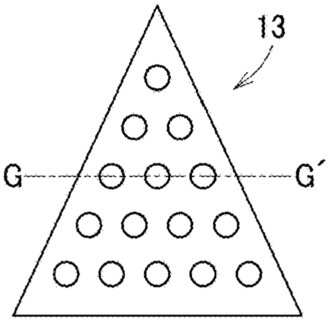
FIG. 8B is an enlarged plan view of the island-shaped joint pattern of a fourth joint.
Figure 8C:
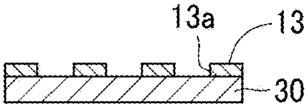
FIG. 8C is a cross-sectional view taken along line G-G'.

Thus, in order to reduce the area of a solid film, as in FIGS. 8B and 8C, an island-shaped joint pattern 13 having a recess 13*a* is formed. The area of the solid film of the island-shaped joint pattern 13 can be reduced by the area of the recess 13*a*, so that a reduction can be made in the possibility of entry of foreign substances to the solid film.

In addition, a reduction can be made in the amount of adhesive for the solid film. Furthermore, anchor effect due to entry of adhesive to the recess 13*a* achieves an effect for an enhancement in the strength of joining.

Figure 8D:
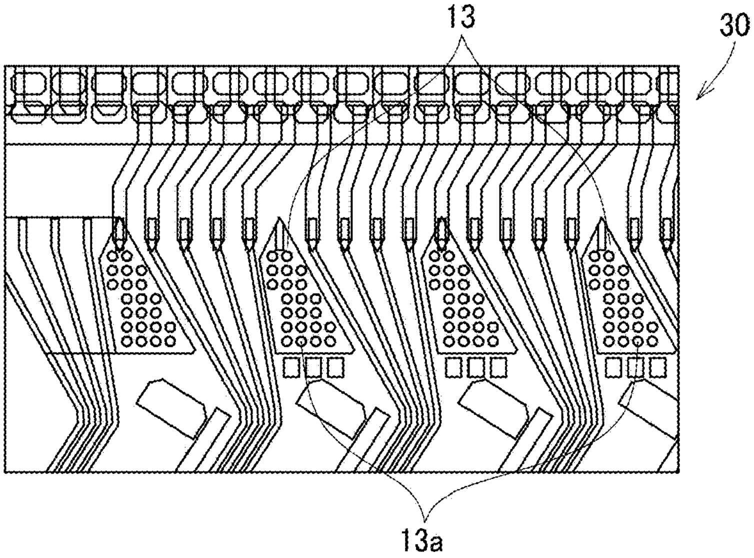
FIG. 8D is a plan view of island-shaped joint patterns.

FIG. 8D illustrates an exemplary configuration in which island-shaped joint patterns 13 are each provided as a non-functional wiring member having no external electrical connection. The island-shaped joint patterns 13 each provided as a non-functional wiring member enable reduction in occurrence of electrical trouble. The island-shaped joint patterns 13 can be each provided as a functional wiring member having external electrical connection. A plurality of island-shaped joint patterns 13 each provided as a functional wiring member and a plurality of island-shaped joint patterns 13 each provided as a non-functional wiring member may be alternately arrayed.

Modification 1

Figure 9A:
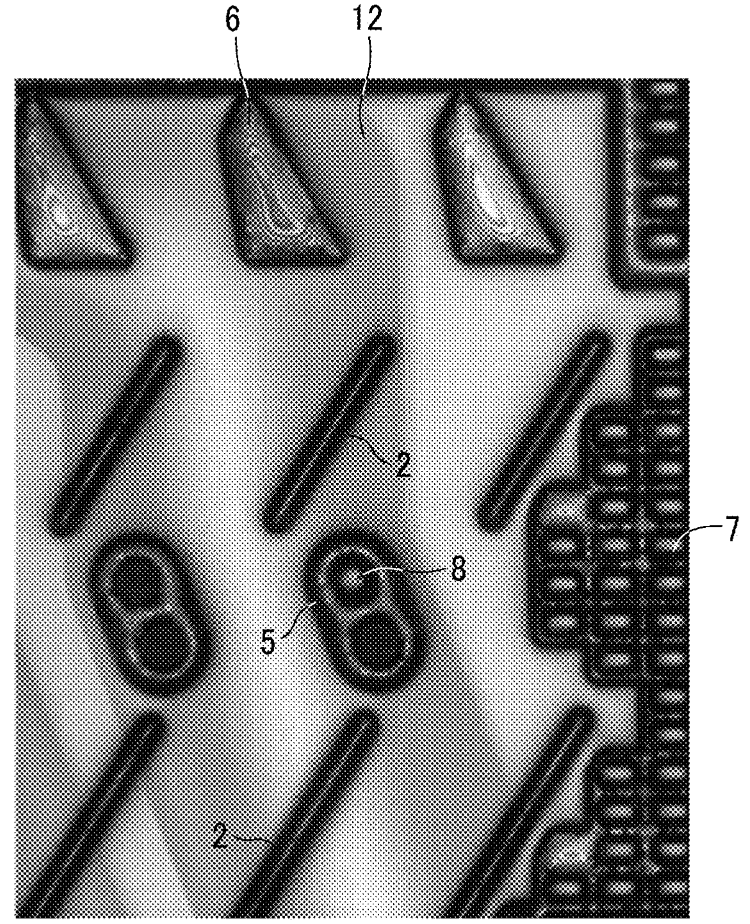
FIG. 9A is a plan view of an actuator substrate having first to fourth joints according to Modification 1.

FIG. 9A illustrates Modification 1 of the third joint 5, which envelops supply channels 8, described above with FIGS. 4A and 4B. The third joint 5 described with FIGS. 4A and 4B is rectangular in shape. In contrast, referring to FIG. 9A, a third joint 5 is shaped like a figure eight of a solid line.

Such formation of the third joint 5 as above enables a reduction in the possibility of entry of foreign substances to a solid film with a reduction in the bond area around supply channels 8 and a reduction in the usage of adhesive.

Modification 2

Figure 9B:
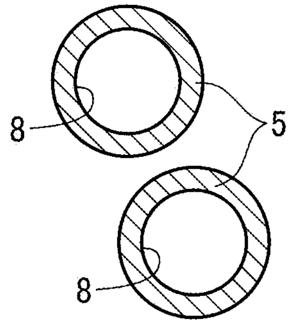
FIG. 9B is a plan view of a third joint according to Modification 2.

FIG. 9B illustrates Modification 2 of the third joint 5. Two third joints 5 are independently formed, respectively, along the circumferences of two supply channels 8. In this case, each third joint 5 is annular in shape, concentrically with the corresponding supply channel 8. Thus, a further reduction can be made in the possibility of entry of foreign substances to a solid film with a further reduction in the bond area around supply channels 8 and a further reduction in the usage of adhesive.

Modification 3

Figure 10A:
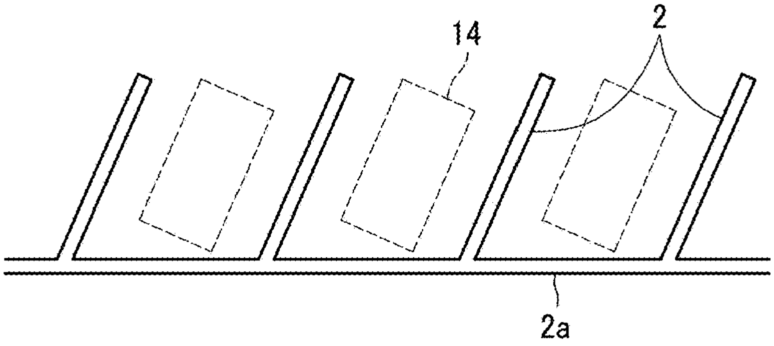
FIG. 10A is a plan view according to Modification 3 of the first embodiment of the present embodiment.

FIG. 10A illustrates Modification 3 of the second joint 2 described above with FIG. 4A. The second joints 2 in FIG. 4A are each independently formed as a single linear joint.

In contrast to this, referring to FIG. 10A, second joints 2 are mutually jointed through a coupler 2*a* linear in shape. Since one side of housing areas 14 for respective piezoelectric elements 40 is closed by the coupler 2*a*, crosstalk propagation that detours outward around a second joint 2 to the adjacent piezoelectric element 40 can be reduced.

Modification 4

Figure 10B:
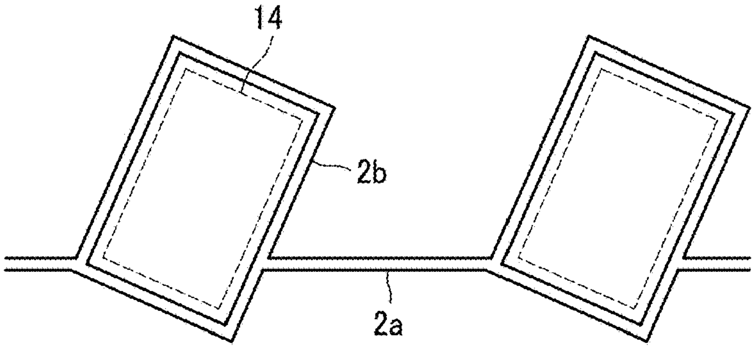
FIG. 10B is a plan view according to Modification 4 of the third embodiment of the present embodiment.

FIG. 10B illustrates Modification 4 of the second joint 2*b* described above with FIG. 7A. The second joints 2*b* in FIG. 7A are each independently shaped like a rectangular frame.

In contrast to this, referring to FIG. 10B, second joints 2*b* are mutually joined through a coupler 2*a* linear in shape. Crosstalk propagation to an adjacent piezoelectric element 40 can be reduced by the coupler 2*a*.

Modification 5

Figure 11:
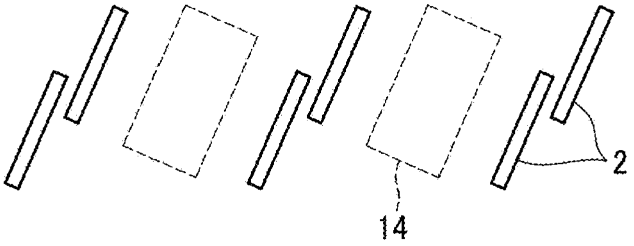
FIG. 11 is a plan view according to Modification 5 of the second embodiment.

FIG. 11 illustrates Modification 5 of the second joint 2 described above with FIGS. 6A and 6B. The two parallel linear joints of each second joint 2 in FIGS. 6A and 6B enhance the effect of reducing crosstalk. In contrast to this, referring to FIG. 11, each second joint 2 includes two parallel linear joints each shorter in length than each of the two parallel linear joints of each second joint 2 in FIG. 6A.

Then, one end portion of one of the two parallel linear joints of each second joint 2 and one end portion of the other overlap near the center in the longitudinal direction of the corresponding housing area 14 for a piezoelectric element 40. Crosstalk propagation is most likely to occur near the center in the longitudinal direction of each housing area 14. Overlapping one end portion of one of the two parallel linear joints of each second joint 2 and one end portion of the other near the center in the longitudinal direction of the corresponding housing area 14 enables an enhancement in the effect of reducing crosstalk and a reduction in the possibility of entry of foreign substances to a solid film with a reduction in the bond area of each second joint 2 and a reduction in the usage of adhesive.

Modification 6

FIG. 12 illustrates Modification 6 of the structure in which the holder 12 and the diaphragm 30 are joined through the second joints 2 and the non-functional wiring members 3 described above. A non-functional wiring member 3 does not function electrically and results from patterning in a microelectromechanical systems (MEMS) process. The non-functional wiring member 3 can be made a functional wiring member due to connection to an external electrode. However, for prevention of occurrence of electrical trouble, the non-functional wiring member 3 is preferable to the functional wiring member.

The non-functional wiring member 3 disposed to a single second joint 2 includes two parallel joints. That is, each of the two parallel joints of the non-functional wiring member 3 is narrower in width than the single second joint 2. Thus, an area for entry of adhesive AD can be formed between the two parallel joints of the non-functional wiring member 3.

Anchor effect due to entry of adhesive AD to the area enables an improvement in the joining force of the second joint 2 to the diaphragm 30. In this case, the Yong's modulus of the adhesive AD is preferably equal to or more than 2 GPa.

The present embodiment made by the present inventors has been specifically described above based on the embodiments. However, the present embodiment is not limited to the embodiments and thus various modifications can be made without departing from the gist of the present embodiment. Although the use of an epoxy heat-curable adhesive as an example of adhesive has been exemplified, any other type of adhesive can be used as adhesive. Instead of adhesive, for example, a thermal welding film can be used.

[Supplementary Notes]

Supplementary notes of preferred aspects of the present embodiment will be given below.

[First Aspect]

According to a first aspect, a liquid discharge head includes: a nozzle plate having a plurality of nozzle holes; a diaphragm disposed facing an inner face of the nozzle plate; a plurality of individual chambers located between the nozzle plate and the diaphragm, the plurality of individual chambers being connected one-to-one to the plurality of nozzle holes; a plurality of actuators disposed on a side of the diaphragm, the side being opposite to a side of location of the plurality of individual chambers of the diaphragm, the plurality of actuators corresponding one-to-one to the plurality of individual chambers; a first joint; a holder disposed facing the plurality of actuators and the diaphragm, the holder being joined to a peripheral portion of the diaphragm with the first joint interposed between the holder and the peripheral portion; and a plurality of housing areas located between the holder and the diaphragm, the plurality of housing areas housing one-to-one the plurality of actuators, the liquid discharge head being configured to drive each of the plurality of actuators to vibrate the diaphragm and, thus, a droplet is discharged from the corresponding nozzle hole due to pressure generated in the corresponding individual chamber, the liquid discharge head further including: a non-contact area in which the diaphragm and the holder are not joined together in a region excluding the plurality of housing areas inside the first joint; and a second joint joining the diaphragm and the holder together, the second joint being provided between each of the plurality of housing areas.

[Second Aspect]

According to a second aspect, in the liquid discharge head according to the first aspect, the second joint includes: a holder-side joint located on a side of location of the holder; and a diaphragm-side joint pattern located on the diaphragm, the diaphragm-side joint pattern being joined to the holder-side joint with adhesive.

[Third Aspect]

According to a third aspect, in the liquid discharge head according to the second aspect, the second joint is one in number and linear in shape and extends across an array direction of the plurality of nozzle holes.

[Fourth Aspect]

According to a fourth aspect, in the liquid discharge head according to the second aspect, the second joint is two in number and linear in shape and extends across an array direction of the plurality of nozzle holes.

[Fifth Aspect]

According to a fifth aspect, in the liquid discharge head according to the third or fourth aspect, the second joint linear in shape has a width of 20 to 50 μm.

[Sixth Aspect]

According to a sixth aspect, in the liquid discharge head according to the third or fourth aspect, in the second joint, the holder-side joint located on the side of location of the holder is one or two in number and linear in shape and the diaphragm-side joint pattern that is located on the diaphragm and is joined to the holder-side joint through the adhesive is two in number and linear in shape.

[Seventh Aspect]

According to a seventh aspect, in the liquid discharge head according to any one of the first to sixth aspects, the second joint envelops the corresponding housing area.

[Eighth Aspect]

According to an eighth aspect, the liquid discharge head according to any one of the first to seventh aspects further includes: a supply channel for supplying liquid to each of the plurality of individual chambers, the supply channel penetrating through the holder and the diaphragm, the supply channel being located in the region excluding the plurality of housing areas inside the first joint; and a third joint joining the diaphragm and the holder together, the third joint being provided around the supply channel.

[Ninth Aspect]

According to a ninth aspect, in the liquid discharge head according to the eighth aspect, the third joint is similar in cross-sectional shape to the supply channel.

[Tenth Aspect]

According to a tenth aspect, in the liquid discharge head according to the eighth aspect, the third joint includes: a path joint located on a side of location of the holder; and a path joint pattern located on the diaphragm.

[Eleventh Aspect]

According to an eleventh aspect, the liquid discharge head according to any one of the first to tenth aspects further includes a fourth joint joining the diaphragm and the holder together, the fourth joint being provided between the first joint and the second joint.

[Twelfth Aspect]

According to a twelfth aspect, in the liquid discharge head according to the eleventh aspect, the fourth joint includes: an island-shaped joint located on a side of location of the holder; and an island-shaped joint pattern located on the diaphragm, the island-shaped joint pattern being joined to the island-shaped joint with adhesive.

[Thirteenth Aspect]

According to a thirteenth aspect, in the liquid discharge head according to the twelfth aspect, the island-shaped joint pattern includes a plurality of recesses.

[Fourteenth Aspect]

According to a fourteenth aspect, in the liquid discharge head according to any one of the second to thirteenth aspects, the adhesive has a Yong's modulus equal to or more than 2 GPa.

[Fifteenth Aspect]

According to a fifteenth aspect, in the liquid discharge head according to any one of the first to fourteenth aspects, the holder has a thickness of 30 to 500 μm.

[Sixteenth Aspect]

According to a sixteenth aspect, a liquid discharge head unit includes a plurality of liquid discharge heads each being the liquid discharge head according to any one of the first to fifteenth aspects.

[Seventeenth Aspect]

According to a seventeenth aspect, a liquid discharge apparatus includes the liquid discharge head according to any one of the first to fifteenth aspects or the liquid discharge head unit according to the sixteenth aspect.

[Aspect 1]

A liquid discharge head includes: a nozzle plate having multiple nozzles; a diaphragm facing an inner face of the nozzle plate; multiple individual chambers between the nozzle plate and the diaphragm, the multiple individual chambers respectively communicating with the multiple nozzles; multiple actuators on a first face of the diaphragm opposite to a second face of the diaphragm facing the multiple individual chambers, the multiple actuators to deform the diaphragm to discharges a liquid in the multiple individual chambers from the multiple nozzles, respectively; a holder facing the multiple actuators and the diaphragm and joined to a peripheral portion of the diaphragm; a first joint at a first position around a periphery of the holder and joining the diaphragm and the holder; multiple second joints joining the diaphragm and the holder at multiple second positions inside the first position, respectively; multiple housing areas each disposed between two of the multiple second joints, the multiple housing areas respectively housing the multiple actuators; and a non-joint area in which the diaphragm and the holder are not joined in a region except the first joint, the multiple second joints, and the multiple housing areas in the first joint.

[Aspect 2]

In the liquid discharge head according to aspect 1, each of the multiple second joints include: a holder-side joint on the holder; and a diaphragm-side joint on the diaphragm, the diaphragm-side joint joined to the holder-side joint with adhesive.

[Aspect 3]

In the liquid discharge head according to aspect 2, the multiple nozzles are arrayed in a nozzle array direction on the nozzle plate, and each of the multiple second joints has a linear shape extending in a direction intersecting the nozzle array direction.

[Aspect 4]

In the liquid discharge head according to aspect 3, each of the multiple second joints has a shape of two parallel lines extending in a direction intersecting the nozzle array direction.

[Aspect 5]

In the liquid discharge head according to aspect 3, each of the multiple second joints has a linear shape having a width of 20 to 50 μm.

[Aspect 6]

In the liquid discharge head according to aspect 3 or 4, the holder-side joint has a shape of one or two lines, and the diaphragm-side joint has a shape of two parallel lines.

[Aspect 7]

In the liquid discharge head according to aspect 1 or 2, the multiple second joints respectively surround multiple housing areas.

[Aspect 8]

In the liquid discharge head according to aspect 1, further includes: a liquid supply channel penetrating through the holder and the diaphragm, the liquid supply channel disposed outside the multiple housing areas in the first joint; and a third joint around the liquid supply channel and joining the diaphragm and the holder.

[Aspect 9]

In the liquid discharge head according to aspect 8, the third joint surrounds the liquid supply channel.

[Aspect 10]

In the liquid discharge head according to aspect 8, the third joint includes: a channel joint on the holder; and a channel joint pattern on the diaphragm.

[Aspect 11]

In the liquid discharge head according to aspect 1, further includes: a fourth joint between the first joint and the multiple second joints and joining the diaphragm and the holder.

[Aspect 12]

In the liquid discharge head according to aspect 11, the fourth joint includes: an island-shaped joint on the holder; and an island-shaped joint pattern on the diaphragm and joined to the island-shaped joint with adhesive.

[Aspect 13]

In the liquid discharge head according to aspect 12, the island-shaped joint pattern includes multiple recesses.

[Aspect 14]

In the liquid discharge head according to aspect 2, the adhesive has a Yong's modulus equal to or more than 2 GPa.

[Aspect 15]

In the liquid discharge head according to aspect 1, the holder has a thickness of 30) to 500 μm.

[Aspect 16]

In a liquid discharge head unit includes multiple liquid discharge heads including the liquid discharge head according to any one of aspects 1 to 4 and 8 to 15.

[Aspect 17]

A liquid discharge apparatus includes the liquid discharge head unit according to aspect 16.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. A liquid discharge head comprising:

a nozzle plate having multiple nozzles;

a diaphragm facing an inner face of the nozzle plate;

multiple individual chambers between the nozzle plate and the diaphragm, the multiple individual chambers respectively communicating with the multiple nozzles;

multiple actuators on a first face of the diaphragm opposite to a second face of the diaphragm facing the multiple individual chambers, the multiple actuators to deform the diaphragm to discharge a liquid in the multiple individual chambers from the multiple nozzles, respectively;

a holder facing the multiple actuators and the diaphragm and joined to a peripheral portion of the diaphragm;

a first joint at a first position around a periphery of the holder and joining the diaphragm and the holder;

multiple second joints joining the diaphragm and the holder at multiple second positions inside the first position, respectively;

multiple housing areas each disposed between two of the multiple second joints, the multiple housing areas respectively housing the multiple actuators;

a non-joint area in which the diaphragm and the holder are not joined in a region except the first joint, the multiple second joints, and the multiple housing areas in the first joint;

a liquid supply channel penetrating through the holder and the diaphragm, the liquid supply channel disposed outside the multiple housing areas in the first joint; and a third joint around the liquid supply channel and joining the diaphragm and the holder, wherein an area of the non-joint area in the holder is larger than an area joined by the first joint, the multiple second joints, and the third joint.

2. The liquid discharge head according to claim 1, wherein each of the multiple second joints includes:

a holder-side joint on the holder; and a diaphragm-side joint on the diaphragm, the diaphragm-side joint joined to the holder-side joint with adhesive.

3. The liquid discharge head according to claim 2, wherein the multiple nozzles are arrayed in a nozzle array direction on the nozzle plate, and each of the multiple second joints has a linear shape extending in a direction intersecting the nozzle array direction.

4. The liquid discharge head according to claim 3, wherein each of the multiple second joints has a shape of two parallel lines extending in a direction intersecting the nozzle array direction.

5. The liquid discharge head according to claim 3, wherein each of the multiple second joints have a linear shape having a width of 20 to 50 μm.

6. The liquid discharge head according to claim 3, wherein the holder-side joint has a shape of one or two lines, and the diaphragm-side joint has a shape of two parallel lines.

7. The liquid discharge head according to claim 2, wherein the adhesive has a Yong's modulus equal to or more than 2 GPa.

8. The liquid discharge head according to claim 1, wherein the multiple second joints respectively surround multiple housing areas.

9. The liquid discharge head according to claim 1, wherein the third joint surrounds the liquid supply channel.

10. The liquid discharge head according to claim 1, wherein the third joint includes:

a channel joint on the holder; and a channel joint pattern on the diaphragm.

11. The liquid discharge head according to claim 1, further comprising:

a fourth joint between the first joint and the multiple second joints and joining the diaphragm and the holder.

12. The liquid discharge head according to claim 11, wherein the fourth joint includes:

an island-shaped joint on the holder; and an island-shaped joint pattern on the diaphragm and joined to the island-shaped joint with adhesive.

13. The liquid discharge head according to claim 12, wherein the island-shaped joint pattern includes multiple recesses.

14. The liquid discharge head according to claim 1, wherein the holder has a thickness of 300 to 500 μm.

15. A liquid discharge head unit comprising multiple liquid discharge heads including the liquid discharge head according to claim 1.

16. A liquid discharge apparatus comprising the liquid discharge head unit according to claim 15.

17. The liquid discharge head according to claim 1, wherein each second joint includes two parallel linear joints, an open space is located between the two parallel linear joints on a first side of the diaphragm, and the open space is located across from a partition wall, wherein the partition wall partitions the multiple individual chambers on a second side of the diaphragm.

* * * * *